Patented Oct. 25, 1938

2,134,080

UNITED STATES PATENT OFFICE 2,134,080

COMBINED HALF-TONE SCREEN AND NEGATIVE

Louis Flader, Chicago, Ill.

No Drawing. Application October 15, 1935, Serial No. 45,119

2 Claims. (Cl. 95—5.7)

My invention relates to improvements in combined half-tone screens and negatives for immediate use in hand or other cameras and it more especially consists of the features pointed out in the claims.

The purpose of my invention is to combine, as a unitary article of commerce, a half-tone screen with a sensitized plate—a negative—for immediate use in an amateur or professional camera other than such as are used in commercial photoengraving establishments to the end that with every exposure made, on development, a real half-tone negative will be produced, ready for immediate use in having its pictorial record transferred to a metallic plate for subsequent etching to produce a relief or other plate for direct printing. It also is a purpose of the invention to provide a separable screen film which the user can easily apply to an ordinary dry plate, or the screen pattern may be incorporated with the emulsion of a dry plate or dry film, or it may be made removable, so as to be detached during or after development.

In the art of producing halftone printing plates, it is the universal practice to, from a continuous tone photograph, whether retouched or otherwise, make a negative through a halftone screen by placing the photograph on a copy board, illuminating it by light from high powered electric arc lamps, placing a sensitized dry or wet plate in the camera, placing a cross ruled halftone screen in front of the sensitive plate, adjusting the camera so that there is a mathematical relation between the distance the screen is away from the sensitive plate to the distance it is away from the diaphragm in the camera lens, and the further relation of the size of the diaphragm or lens opening to the size of the transparent openings of the half-tone screen. This may be expressed in a formula as follows:

In such a formula $c:a::b:d$ wherein $c$ represents normal screen distance; $a$ screen opening; $b$ camera extension; and $d$ diaphragm opening or lens aperture. For a 150 line screen having a ratio of 1 to 1 pitch will be .00666 (1/150th″). Now substituting numerical values, the screen opening ($a$) will be .00333″, the lens opening ($d$) .5625 ($\frac{9}{16}$″), the camera extension ($b$) 33 inches, and the screen distance ($c$) will be .195 inch.

Heretofore, it has not been possible to secure on a first and single development of a glass or film negative, from an exposure in a hand camera, a direct halftone interpretation of the continuous tones of a pictorial object, but with my invention, I have found it practical to secure such a result with but one exposure and one development. The hand camera automatically establishes a working arrangement over a considerable range between the lens opening and the camera extension to bring the sensitive plate on the focal plane of the lens and in actual practice it has been found that the so-called hard and fast "screen distance" requirements of standard halftone practice are answered by forming a replica of a halftone screen on Cellophane or other thin transparent material directly and placing it in contact with the sensitive surface. If desired for any reason, a replica of a halftone screen may be combined with the emulsion of which the plate is coated, so that on development the translation of the continuous tone lights and shades of the object are made into dots of varying sizes to conform to the pictorial value of the object.

Such a unitary or composite negative may then be transferred onto a metal plate that has been covered with an acid resist coating composed of albumin, gelatin or standard fish glue, sensitized with bichromate of potash or any other light sensitive agents. Wherever light passes through the negative the coating will become hardened and where light does not pass through it will remain soft so as to be easily washed away in warm water. This leaves the metal bare at such points. The parts of the coating not washed away are hardened by applying heat under control, so as to thoroughly resist the action of the etching acid—nitric acid in the case of zinc plates and perchloride of iron in the case of copper plate. Acid applied to the bare portions of the metal will etch out hollows of varying size, leaving printing, dots standing between the hollows, which also vary in size.

To further assist in breaking up the continuous tones of the object into separate dots of varying sizes on the sensitive plate, I may also use a graded dot screen, photographed, printed or otherwise produced on a thin transparent material such as Celluloid or Cellophane. After exposure and development of the negative such a screen will become separated and for the given negative, will serve no further purpose.

As an alternative step, I may incorporate the screen with the emulsion, which screen effect may be in the shape of a positive of the ordinary cross-ruled screen over which the regular emulsion would be placed. On development and subsequently placing the negative face down on a sensitive surface, the incorporated screen images would form screen openings through which light would pass onto the sensitive plate in a modified manner so as to change the continuous tones of the negative into isolated dots of varying size on the sensitive plate.

The broad ground of the invention resides in the very simple procedure of at once producing a halftone screen interpreted negative in the camera by an amateur for direct use in producing an etched plate ready for relief printing, thus making available to the large number of smaller newspapers throughout the country, a practical means for supplying illustrations of local value to their readers on par in a smaller way with the existing facilities at present only available to larger papers.

This great desideratum is attained in a simple and efficient manner without recourse to the complex conventional procedure referred to above, and which are now in ordinary practice. I may use any standard or special emulsion and any cooperative developer in producing my unitary result.

I have described my process in an exemplary way without limiting myself to the specific details or steps of procedure enumerated and I may use whatever alternative or equivalent steps that the exigencies of varying conditions may demand without departing from the broad spirit of the invention.

What I claim is:

1. The process of producing a relief printing plate which consists in using in a hand camera, a photographic plate or film with a sensitive emulsion thereon, in placing a Cellophane half-tone screen in contact with the plate or film, in subjecting the emulsion to a single exposure from the image of an object projected first through the half-tone screen, in developing the latent image by a single development to produce dots in the emulsion of varying sizes and shapes, the areas corresponding to the changes of light and shade of the object, in coating a metallic plate with a light sensitive agent, in transferring the variable area dots to the coating on the metallic plate through the action of light passing through the negative to produce acid resistant areas, and in etching the surface between such areas to produce a relief plate for direct printing.

2. A photographic printing process which consists in making a single exposure of an object on a film or plate having a light sensitive coating thereon associated with a thin Cellophane half tone screen held in direct contact therewith such exposure being made through the screen before reaching the emulsion in accordance with the varying lights and shades of the object to thereby translate the continuous tones of the object into varying sized latent image areas in the coating, in developing the exposed emulsion, in optically transferring the multiple dot areas onto a pre-coated metallic plate made sensitive to light such transfer being in acid resistant dots of inverse areas which leave the metallic plate uncovered between the dots, and in subsequently etching the uncovered areas of the plate to produce cavities between the dots to constitute a plate ready for instant relief printing.

LOUIS FLADER.